US009034133B2

(12) United States Patent
Chow

(10) Patent No.: US 9,034,133 B2
(45) Date of Patent: May 19, 2015

(54) POLYURETHANE FOAM TOYS WITH NO RESTRICTION ON PLAYING ENVIRONMENT AND THE MANUFACTURING METHOD THEREOF

(76) Inventor: Kwong Lam Thomas Chow, Gaoyao (CN)

(*) Notice: Subject to any disclaimer, the term of this patent is extended or adjusted under 35 U.S.C. 154(b) by 310 days.

(21) Appl. No.: 13/614,367

(22) Filed: Sep. 13, 2012

(65) Prior Publication Data
US 2013/0245144 A1    Sep. 19, 2013

(30) Foreign Application Priority Data

Mar. 19, 2012  (CN) .......................... 2012 1 0072051

(51) Int. Cl.
| | |
|---|---|
| *B32B 5/00* | (2006.01) |
| *B32B 29/02* | (2006.01) |
| *B29C 47/06* | (2006.01) |
| *A63B 45/00* | (2006.01) |
| *A63H 33/00* | (2006.01) |
| *B29C 44/14* | (2006.01) |
| *C08G 18/48* | (2006.01) |

(Continued)

(52) U.S. Cl.
CPC .................. *A63H 33/00* (2013.01); *A63B 37/12* (2013.01); *A63B 45/00* (2013.01); *A63B 2037/065* (2013.01); *A63B 2208/12* (2013.01); *A63B 2243/007* (2013.01); *B29C 44/143* (2013.01); *C08G 18/4804* (2013.01); *C08G 18/6677* (2013.01); *C08G 18/7664* (2013.01); *C08G 2101/0008* (2013.01); *C08J 9/145* (2013.01); *C08J 2375/08* (2013.01); *C09J 175/04* (2013.01)

(58) Field of Classification Search
CPC .... B29C 44/14; B29C 44/143; B29C 44/146; A63B 2208/12; A63B 2243/007

USPC ................................... 521/155; 156/178, 500
See application file for complete search history.

(56) References Cited

U.S. PATENT DOCUMENTS

2008/0236448 A1* 10/2008 Shane .......................... 106/38.2

FOREIGN PATENT DOCUMENTS

| CN | 1063445 | 8/1992 |
|---|---|---|
| CN | 1247124 | 3/2000 |

OTHER PUBLICATIONS

Machine translation of Detailed Description of CN 1063445 obtained from the European Patent Office Sep. 2014.*

(Continued)

*Primary Examiner* — Melissa Rioja
(74) *Attorney, Agent, or Firm* — The Farrell Law Firm, P.C.

(57) ABSTRACT

A method of manufacturing polyurethane (PU) foam toys with no restriction on playing environment comprises steps as follows: (1) Placing the prefabricated flexible cover into the foaming mold, and then vacuuming to firmly attach the cover to the inner wall of the mold; (2) Spraying adhesives at the periphery and the interior of the flexible cover while maintaining the continuous vacuum pressure; (3) Injecting the mixed polyurethane into the foaming mold; (4) Closing the mold and performing condensation reaction; (5) Opening the mold to get the product. The present invention is about the production of polyurethane form toys by formulating polyurethanes and binding the interior polyurethane body and flexible cover with adhesives. Because of its resilient and sturdy characteristics, the thermoplastic flexible cover provides protection to the interior polyurethane foam body, effectively eliminating problems like mildew growth, difficulties of cleaning and preventing damage.

9 Claims, 3 Drawing Sheets

(51) Int. Cl.
*C08G 18/66* (2006.01)
*C08G 18/76* (2006.01)
*C08J 9/14* (2006.01)
*A63B 37/12* (2006.01)
*A63B 37/06* (2006.01)
*C08G 101/00* (2006.01)
*C09J 175/04* (2006.01)

(56) References Cited

OTHER PUBLICATIONS

Machine translation of Detailed Description of CN 1247124 obtained from the European Patent Office Sep. 2014.*

* cited by examiner

POLYURETHANE FOAM TOYS WITH NO RESTRICTION ON PLAYING ENVIRONMENT AND THE MANUFACTURING METHOD THEREOF

PRIORITY

This application claims priority to an application filed in the Chinese Intellectual Property Office on Mar. 19, 2012 and assigned Serial No. 201210072051.6, the entire contents of which are hereby incorporated by reference.

BACKGROUND OF THE INVENTION

1. Technical Field

The present invention relates to polyurethane (hereafter referred to as "PU") foam plastic technology.

2. Description of the Related Art

Polyurethane foam is normally produced through the polymerization of isocyanates and hydroxyl compound group. Depending on its hardness, polyurethane foam can be classified as flexible and rigid, wherein flexible foams are the largest category of polyurethane foams. In general, PU foam has properties of great elasticity, high flexibility, very good tensile stretch and compressive strength; it's also chemically stable and exhibits resistance to most of solvents and oil base liquid. PU foam has a good abrasion resistance, which is 20-fold better than natural sponge. Additionally, PU foams are utilized in manufacturing children's toys because it shows desired characteristics such as easy processability, good athermancy and adhesivity as one of the excellent cushioning materials.

Present PU foam products exhibit several deficits in the process of playing: 1) the large amount of open pores prompt adsorption of moisture in contact, plus its slow-drying nature, causing the growth of mildew so as to harm children's health; 2) Stains from a muddy damp environment cannot be thoroughly cleaned; 3) the flexible cover of the product is easily damaged while playing.

A Chinese Patent CN1247124 published on 2000 Mar. 15, entitled as "A method of manufacturing PU foam seamless leather pads", disclosed a manufacturing method of seamless leather pads. The invention involves processes of putting the polyurethane PVC or PU leather onto the pre-shaped negative mold, and then vacuuming to stretch the leather to tightly attach on the negative mold chamber with the negative pressure system of the vacuum suction device. A layer of PU with the thickness of 0.4-0.6 mm is formed on the inner surface of the leather. Then the liquid polyurethane material containing 30-40% of isocyanates and 60-70% of polyurethane is pumped into the mold chamber at high pressure. The product is obtained following completely foaming at 35-50° C. In the production, the successful binding between interior polyurethane and the exterior soft leather depends on the formation of polyurethane layer, which is 0.4-0.6 mm in thickness, on the inner surface of the soft leather. Additionally, this technique uses soft leather as outside cover. Soft leather, as a coil material of broad width offering solely simple and limited surface patterns, is unable to provide a rich variety of patterns and colors.

SUMMARY OF THE INVENTION

In consideration of the deficits in prior art, the present invention provides a type of improved PU foam toys, which have no restriction on the playing environment.

In order to achieve the aforementioned objectives, the present invention adopts the following technical procedures for manufacturing PU foam toys with no restriction on the playing environment:

1) Placing the prefabricated flexible cover into the foaming mold, and then vacuuming to firmly attach the cover to the inner wall of the mold;
2) Spraying adhesives at the periphery and the interior of the flexible cover while maintaining the continuous vacuum pressure;
3) Injecting the mixed polyurethanes into the foaming mold;
4) Closing the mold and performing condensation reaction;
5) Opening the mold to obtain the product.

Said flexible cover is soft plastic with a material hardness below Shore A 70, such as PVC, or TPE, or TPR, or TPU or EVA.

Said adhesive composition is obtained by dissolving thermoplastic polyurethane resin, chloroprene rubber, and tackifier resin mixture into organic mixed solvent, 100% Butanone. The final mixture comprises 92-94% of Butanone and 6-8% of the mixture of resin and rubber on a mass basis, wherein the composition is as follows:

| | |
|---|---|
| Thermoplastic polyurethane | 50-70 |
| Chloroprene rubber | 20-30 |
| Tackifier resin | 10-20. |

Said adhesive helps form a strong bond between the PU body and the flexible cover.

Said polyurethane is obtained by blending composition P and composition I with a mass ratio of P:I=100: (60~70), wherein:

Composition P is obtained by mixing the following polyether polyols on a mass basis:

| | |
|---|---|
| Polyether polyols 330N | 30-50 |
| Polyether polyols 360N | 20-30 |
| Polymeric polyols 36/30G | 30-40; |

Composition I contains polymerized MDI BASF M20S and liquidized MDI BASF MP113, and is obtained by mixing polymerized MDI M20S/liquidized MDI MP113=50/(50~70) on a mass basis. Other brands or types of MDI with similar property index can be used as a substitute.

Furthermore, said composition P contains additives which are made of the following components on a mass basis:

| | |
|---|---|
| Amine catalyst 33LV | 0.6-1.0 |
| Cross-linking agent glycerol | 2.0-3.0 |
| Chain extender Ethylene glycerol | 0.3-0.8 |
| Stabilizing agent Silicone oil | 0.3-0.6 |
| Chemical foaming agent Water $H_2O$ | 2.3-3.5 |
| Physical foaming agent Methylene dichloride | 10-15 |

Said flexible cover features exterior pattern that is exactly match to the inner wall of the mold, thus to ensure the structural appearance of the product meeting the designing standards at negative pressure.

The present invention provides PU foam toys with no restriction on playing environment and fabricated in accordance with any of the aforementioned methods.

Preferably, said toys are ball-shaped toys.

PU foam toys of the present invention are produced by formulating the polyurethane material and binding the interior PU body and the flexible cover with adhesives. Because of its resilient and sturdy characteristics, the thermoplastic flexible cover provides protection to the interior PU foam body, effectively eliminating problems like mildew growth, difficulties of cleaning and preventing damage. Additionally, the present invention adopts techniques that can apply complex and delicate patterns to the product exterior structure, and utilize double- or multi-color injection molding. Said techniques are highly compatible to the production of foaming toys.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention are described as follows with reference to the accompanying drawings. In the following description, well-known functions or constructions may be omitted where such a description would obscure the invention in unnecessary detail.

First Embodiment of the Present Invention

This embodiment is in regard to the production of PU foam toys.

FIGS. 1-6 illustrate the production of PU foam toys of the present invention.

Figure 1:
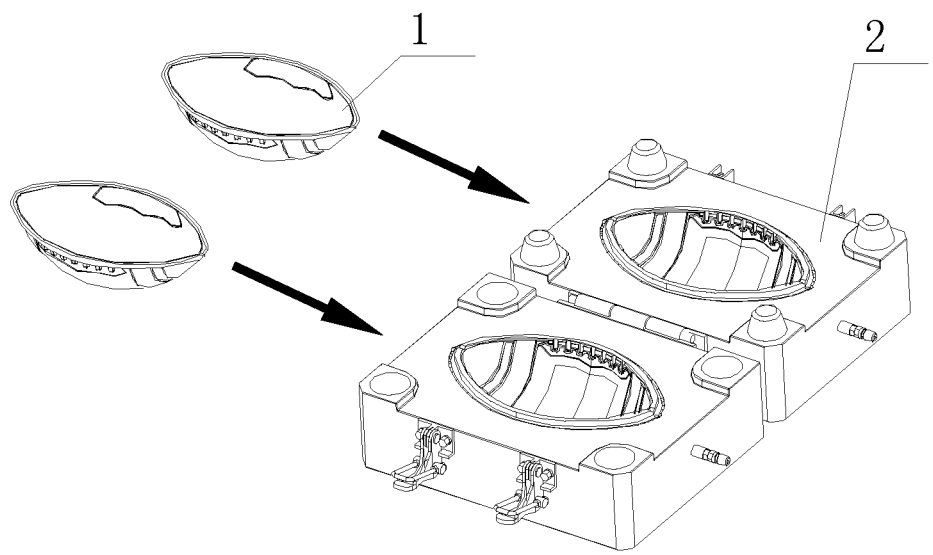
FIG. 1 is a diagram of placing the flexible cover into the mold.
Figure 2:
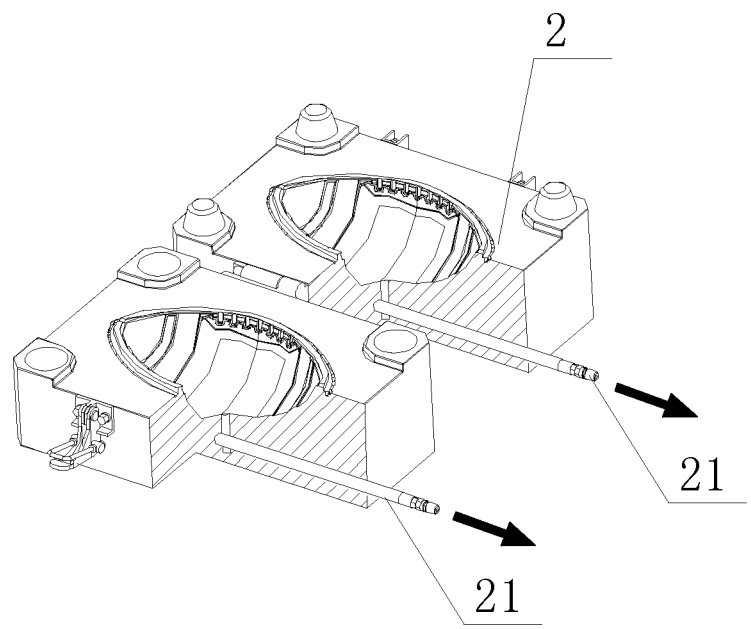
FIG. 2 is a diagram of vacuuming the mold with the flexible cover settling inside.

Step 1: as illustrated in FIGS. 1-2, place the prefabricated flexible cover 1 into the foaming mold 2 and vacuum to firmly attach it to the inner wall of the mold 2 through the vacuum tubing on the mold.

Said flexible exterior is soft plastic with a material hardness below Shore A 70, such as PVC, TPE, TPR, TPU or EVA. Said flexible cover features exterior patterns molded by injection mold. Flexible cover can be chosen from single-color leather, or leathers made from two-color or multi-color injection molding. Said two-color injection molding refers to an injection molding process that sequentially performed twice using two feeding tubes of the double-shot injection molding machine in conjunction with two sets of molds. This technique is commonly known in prior art and will not be further discussed here.

The inner wall of foaming mold features pattern matched with the exterior of the flexible cover. The foaming mold is fabricated with the aid of computer programming in consideration of material shrinkage and the specification of the foaming mold, ensuring the exact match of the patterns on the inner wall of foaming mold and the flexible cover.

Figure 3:
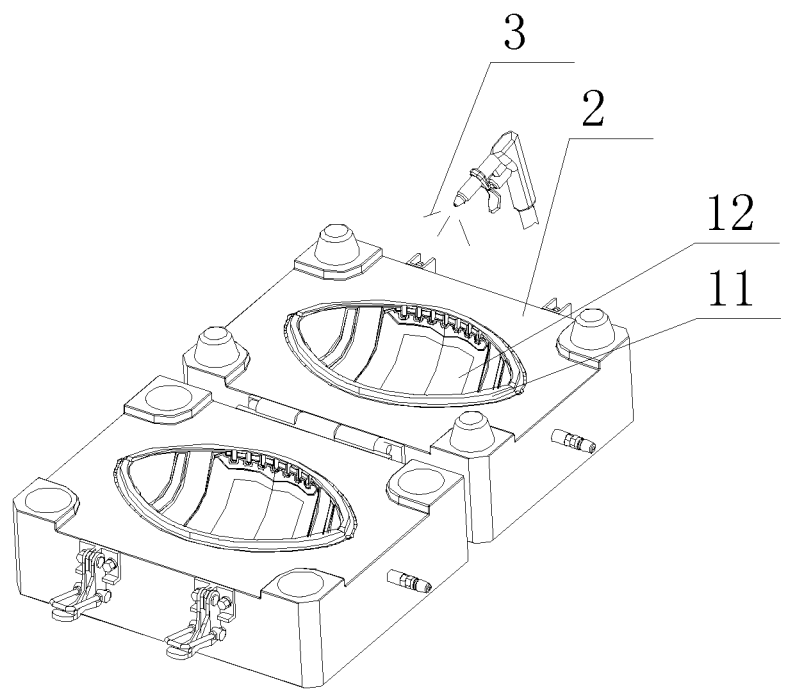
FIG. 3 is a diagram of spraying adhesives at the periphery and the interior of the flexible cover.

STEP 2: As illustrated in FIG. 3, spraying adhesives 3 at the periphery 11 and the interior 12 of flexible cover 1 under the continuous vacuum pressure.

Said adhesive is obtained by dissolving thermoplastic polyurethane resin, chloroprene rubber, and tackifier resin mixture into organic mixed solvent, 100% MEK (Butanone). The final mixture composes of 92-94% of MEK by mass. The composition of thermoplastic polyurethane resin, chloroprene rubber, and tackifier resin is as follows (based on the total mass of the mixture of thermoplastic PU resin, chloroprene rubber and tackifier resin is 100):

| | |
|---|---|
| Thermoplastic polyurethane | 60; |
| Chloroprene rubber | 30; and |
| Tackifier resin | 10. |

Figure 4:
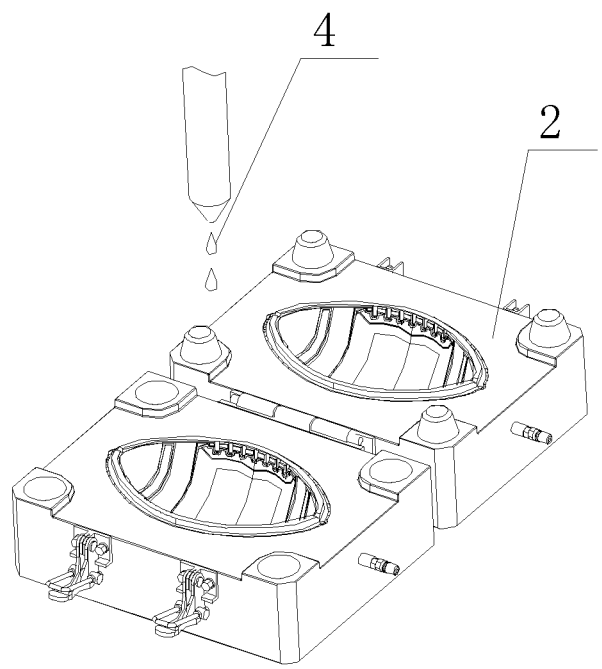
FIG. 4 is a diagram of injecting mixed polyurethane.

STEP 3: As illustrated in FIG. 4, the PU material 4 is pumped into the mold.

Said polyurethane material 4 is obtained by blending composition P and composition I with PU foaming perfusion machine after accurate measurement at a mass ratio of P:I=100:60.

Composition P is obtained by mixing various polyether polyols and several additives. Given the total mass of polyols is 100, the composition of each polyether polyols components is as follows:

| | |
|---|---|
| Polyether polyols 330N | 40; |
| Polyether polyols 360N | 30; and |
| Polymeric polyols 36/30G | 30. |

The formation of the additives is as follows (based on the total mass of Composition P is 100):

| | |
|---|---|
| Amine catalyst 33LV | 0.8; |
| Cross-linking agent glycerol | 2.0; |
| Chain extender Ethylene glycerol | 0.5; |
| Stabilizing agent Silicone oil | 0.4; |
| Chemical foaming agent Water $H_2O$ | 3.0; and |
| Physical foaming agent Methylene dichloride | 12. |

Composition I contains polymerized MDI BASF M20S and liquidized MDI BASF MP113, and is obtained by mixing polymerized MDI M20S/liquidized MDI MP113=50/55 on a mass basis. Other brands or types of MDI with similar property index can be used as a substitute.

Figure 5:
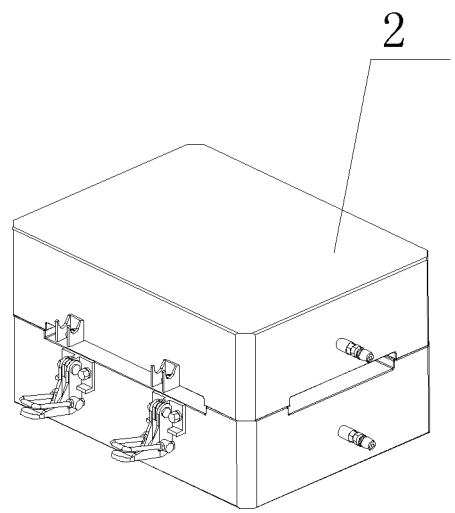
FIG. 5 is a diagram of closing the mold and performing condensation reaction.

STEP 4: As illustrated in FIG. 5, close the mold and perform condensation reaction so that the PU foam is formed in the mold.

Figure 6:
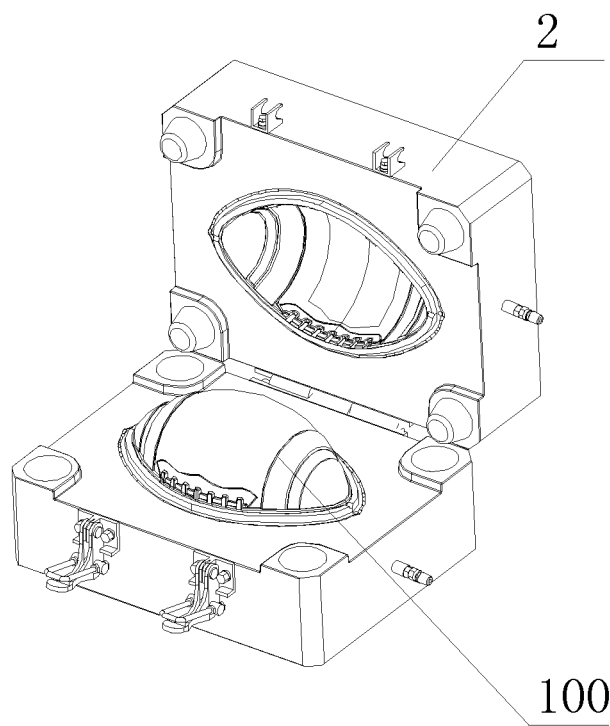
FIG. 6 is a diagram of opening the mold.

STEP 5: As illustrated in FIG. 6, open the mold to obtain product 100.

The product 100 has a flexible cover filled with polyurethane. Because of the adhesives and the force of locked mold, the upper and lower halves of exterior cover bind together firmly to protect the PU foam inside. The PU foam toys of the present invention are preferably PU foam balls, in a shape of circle or oval.

The Second Embodiment of the Present Invention

This embodiment is also an embodiment of producing PU foam toys.

The manufacturing method of PU foam toys of the present invention is illustrated in FIGS. 1-6.

STEP 1: as illustrated in FIGS. 1-2, placing the flexible cover 1 into the foamed mold 2 and vacuum to firmly attach it to the inner wall of the mold 2 through the vacuum tubing on the mold.

Said flexible exterior is flexible plastic with a material hardness below Shore A 70, such as PVC, TPE, TPR, TPU or EVA, which is fabricated by injection molding. Flexible cover can be chosen from single-color leather, or leathers made from two-color or multi-color injection molding.

The inner wall of foaming mold features pattern matched with the exterior of the flexible cover. The foaming mold is fabricated with the aid of computer programming in consideration of material shrinkage and the specification of the foaming mold, ensuring the exact match of the patterns on the inner wall of foaming mold and the flexible cover.

STEP 2: As illustrated in FIG. 3, spray adhesives at the periphery 11 and the interior 12 of flexible cover 1 under the continuous vacuum pressure.

Said adhesive is obtained by dissolving thermoplastic polyurethane resin, chloroprene rubber, and tackifier resin mixture into organic mixed solvent, 100% MEK (Butanone). The final mixture contains 92-94% of MEK by mass. The composition of thermoplastic polyurethane resin, chloroprene rubber, and tackifier resin is as follows (based on the total mass of the mixture of thermoplastic PU resin, chloroprene rubber and tackifier resin is 100):

| | |
|---|---|
| Thermoplastic polyurethane | 60; |
| Chloroprene rubber | 25; and |
| Tackifier resin | 15. |

STEP 3: As illustrated in FIG. 4, the PU material 4 is pumped into the mold.

Said polyurethane material 4 is obtained by blending composition P and composition I with PU foaming perfusion machine after accurate measurement at a mass ratio of P:I=100:65.

Composition P is obtained by mixing various polyether polyols and several additives. Given the total mass of polyols is 100, the composition of each polyether polyols components is as follows:

| | |
|---|---|
| Polyether polyols 330N | 35; |
| Polyether polyols 360N | 35; and |
| Polymeric polyols 36/30G | 30. |

The formation of the additives is as follows (based on the total mass of Composition P is 100):

| | |
|---|---|
| Amine catalyst 33LV | 1.0; |
| Cross-linking agent glycerol | 2.5; |
| Chain extender Ethylene glycerol | 0.6; |
| Stabilizing agent Silicone oil | 0.3; |
| Chemical foaming agent Water $H_2O$ | 3.2; and |
| Physical foaming agent Methylene dichloride | 13. |

Composition I contains polymerized MDI BASF M20S and liquidized MDI BASF MP113, and is obtained by mixing polymerized MDI M20S/liquidized MDI MP113=50/55 on a mass basis STEP 4: As illustrated in FIG. 5, close the mold and perform condensation reaction so that the PU foam is formed in the mold.

STEP 5: As illustrated in FIG. 6, open the mold to obtain product 100.

Third Embodiment of the Present Invention

This is another embodiment of producing PU foam toys.

The manufacturing method of PU foam toys of the present invention is illustrated in FIGS. 1-6.

STEP 1: as illustrated in FIG. 1-2, placing the flexible exterior cover 1 into the foamed mold 2 and vacuum to create firm attachment to the inner wall of the mold 2 through the vacuum tubing on the mold.

Said flexible exterior is flexible plastic with a material hardness below Shore A 70, such as PVC, TPE, TPR, TPU or EVA, which is fabricated by injection molding. Flexible cover can be chosen from single-color leather, or leathers made from double-color or multi-color injection molding.

The exterior of said flexible cover features pattern matched with the inner wall of foaming mold. The foaming mold is fabricated with the aid of computer programming in consideration of material shrinkage and the specification of the foaming mold, ensuring the exact match of the patterns on the inner wall of foaming mold and the flexible cover.

STEP 2: As illustrated in FIG. 3, spraying adhesives at the periphery 11 and the interior 12 of flexible cover 1 under the continuous vacuum pressure.

Said adhesive is obtained by dissolving thermoplastic polyurethane resin, chloroprene rubber, and tackifier resin mixture into organic mixed solvent, 100% MEK (Butanone). The final mixture contains 92-94% of MEK by mass. Given the total mass of the mixture of thermoplastic PU resin, chloroprene rubber and tackifier resin is 100, the composition of each components is as follows:

| | |
|---|---|
| Thermoplastic polyurethane | 70; |
| Chloroprene rubber | 20; and |
| Tackifier resin | 10. |

STEP 3: As illustrated in FIG. 4, the PU material 4 is pumped into the mold.

Said polyurethane material 4 is obtained by blending composition P and composition I with PU foaming perfusion machine after accurate measurement at a mass ratio of P:I=100:70.

Composition P is obtained by mixing various polyether polyols and several additives. Given the total mass of polyols is 100, the composition of each polyether polyols components is as follows:

| | |
|---|---|
| Polyether polyols 330N | 30; |
| Polyether polyols 360N | 30; and |
| Polymeric polyols 36/30G | 40. |

The formation of the additives is as follows (based on the total mass of Composition P is 100)

| | |
|---|---|
| Amine catalyst 33LV | 1.0; |
| Cross-linking agent glycerol | 2.8; |
| Chain extender Ethylene glycerol | 0.5; |
| Stabilizing agent Silicone oil | 0.5; |
| Chemical foaming agent Water $H_2O$ | 3.2; and |
| Physical foaming agent Methylene dichloride | 14. |

Composition I contains polymerized MDI BASF M20S and liquidized MDI BASF MP113, and is obtained by mixing polymerized MDI M20S/liquidized MDI MP113=50/55 on a mass basis.

STEP 4: As illustrated in FIG. 5, closing the mold and performing condensation reaction so that the PU foam is formed in the mold.

STEP 5: As illustrated in FIG. 6, opening the mold to get product 100.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of manufacturing polyurethane (PU) foam toys with no restriction of playing environment, the method comprising:
   1) Placing a prefabricated flexible cover into a foaming mold, and then vacuuming to firmly attach said flexible cover to an inner wall of the foaming mold;
   2) Spraying adhesives at a periphery and an interior of the flexible cover while maintaining continuous vacuum pressure;
   3) Injecting a reaction mixture that forms a polyurethane into the foaming mold;
   4) Closing the foaming mold and performing condensation reaction;
   5) Opening the foaming mold to obtain a polyurethane foam toy,
   wherein said adhesives are obtained by dissolving a mix of resin and rubber of thermoplastic polyurethane resin, chloroprene rubber, and a tackifier resin mixture into an organic solvent of 100% Butanone to obtain a final mixture, the organic solvent accounts for 92-94% by mass of the final mixture while the mix of resin and rubber accounts for 6-8%; and the mix of resin and rubber comprises ingredients as follows:
   50-70% by mass of thermoplastic polyurethane resin,
   20-30% by mass of chloroprene rubber, and
   10-20% by mass of tackifier resin.

2. The manufacturing method of claim 1, wherein said flexible cover is flexible plastic with a material hardness below Shore A 70.

3. The manufacturing method of claim 1, wherein said method further comprises forming exterior patterns provided by an injection mold in the flexible cover; and said foaming mold is fabricated with the aid of computer programming in accordance with a specification of the injection mold, generating patterns on the inner wall of the mold matched with those of said flexible cover.

4. A polyurethane foam toy with no restriction on playing environment manufactured according to the method of claim 1.

5. The polyurethane foam toy of claim 4, wherein said flexible cover is flexible plastic with a material hardness below Shore A 70.

6. The polyurethane foam toy of claim 4, wherein said flexible cover features exterior patterns molded by an injection mold; and said foaming mold is fabricated with the aid of computer programming in accordance with the specification of the injection mold, generating patterns on the inner wall of the mold matched with those of said flexible cover.

7. The polyurethane foam toy of claim 4, wherein said toys are ball-shaped toys.

8. The manufacturing method of claim 2, wherein said flexible plastic with a material hardness below Shore A 70 comprises polyvinyl chloride, thermoplastic elastomer, thermo-plastic-rubber, thermoplastic polyurethanes, or ethylene-vinyl acetate copolymer.

9. The polyurethane foam toy of claim 5, wherein said flexible plastic with a material hardness below Shore A 70 comprises polyvinyl chloride, thermoplastic elastomer, thermo-plastic-rubber, thermoplastic polyurethanes, or ethylene-vinyl acetate copolymer.

* * * * *